United States Patent
Kiso et al.

(10) Patent No.: US 7,183,331 B2
(45) Date of Patent: Feb. 27, 2007

(54) METHOD FOR PRODUCING A RIGID POLYURETHANE FOAM

(75) Inventors: Hiroyuki Kiso, Shinnanyo (JP); Katsumi Tokumoto, Tokuyama (JP); Yutaka Tamano, Tokuyama (JP)

(73) Assignee: Tosoh Corporation, Yamaguchi-ken (JP)

( * ) Notice: Subject to any disclaimer, the term of this patent is extended or adjusted under 35 U.S.C. 154(b) by 0 days.

(21) Appl. No.: 10/780,669

(22) Filed: Feb. 19, 2004

(65) Prior Publication Data

US 2004/0162360 A1    Aug. 19, 2004

Related U.S. Application Data

(62) Division of application No. 10/187,417, filed on Jul. 2, 2002, now Pat. No. 6,777,456.

(30) Foreign Application Priority Data

| Jul. 2, 2001 | (JP) | 2001-200960 |
| Jul. 23, 2001 | (JP) | 2001-221551 |
| Jul. 23, 2001 | (JP) | 2001-221552 |

(51) Int. Cl.
 *C08G 18/28* (2006.01)
(52) U.S. Cl. ............ 521/129; 521/117; 521/128; 521/131; 521/164; 521/170; 521/174
(58) Field of Classification Search ............ 521/117, 521/128, 129, 131, 164, 170, 174
See application file for complete search history.

(56) References Cited

U.S. PATENT DOCUMENTS

| 4,049,931 | A | | 9/1977 | Sandner et al. | |
| 4,107,229 | A | * | 8/1978 | Tideswell et al. | 525/502 |
| 5,177,117 | A | | 1/1993 | Coe et al. | |
| 5,688,834 | A | | 11/1997 | Parker et al. | |
| 5,866,029 | A | | 2/1999 | Lund et al. | |
| 5,958,990 | A | * | 9/1999 | Grimminger | 521/125 |
| 6,031,013 | A | * | 2/2000 | Scherzer et al. | 521/174 |
| 6,080,799 | A | | 6/2000 | Kruecke et al. | |
| 6,086,788 | A | | 7/2000 | Bogdan et al. | |
| 6,306,920 | B1 | * | 10/2001 | Heinemann et al. | 521/174 |
| 6,359,022 | B1 | * | 3/2002 | Hickey et al. | 521/114 |
| 6,410,608 | B1 | | 6/2002 | Sakai et al. | |
| 6,534,556 | B2 | * | 3/2003 | Lacarte et al. | 521/174 |
| 6,777,456 | B2 | * | 8/2004 | Kiso et al. | 521/128 |

FOREIGN PATENT DOCUMENTS

| EP | 0 842 972 A1 | 5/1998 |
| WO | WO 97/38045 | 10/1997 |
| WO | WO 01/44352 A2 | 6/2001 |

* cited by examiner

*Primary Examiner*—John M. Cooney, Jr.
(74) *Attorney, Agent, or Firm*—Nixon & Vanderhye P.C.

(57) ABSTRACT

A method for producing a rigid polyurethane foam, which comprises reacting a polyol with a polyisocyanate in the presence of an amine catalyst and a blowing agent, wherein as the amine catalyst, at least one amine compound having at least one type of substituent selected from the group consisting of a hydroxyl group, a primary amino group and a secondary amino group in its molecule, or N-(2-dimethylaminoethyl)-N'-methylpiperazine, is used, and as the blowing agent, 1,1,1,3,3-pentafluoropropane (HFC-245fa) and/or 1,1,1,3,3-pentafluorobutane (HFC-365mfc) is used.

1 Claim, No Drawings

METHOD FOR PRODUCING A RIGID POLYURETHANE FOAM

CROSS REFERENCE TO RELATED APPLICATION

This application is a divisional of application Ser. No. 10/187,417 filed Jul. 2, 2000 now U.S. Pat. No. 6,777,456.

The present invention relates to a method for producing a rigid polyurethane foam by reacting a polyol with a polyisocyanate in the presence of an amine catalyst, a blowing agent and other auxiliary agents, as the case requires. More particularly, it relates to a method for producing a rigid polyurethane foam excellent in the flowability, thermal conductivity, moldability and dimensional stability of the foam, wherein as the blowing agent, 1,1,1,3,3-pentafluoropropane (HFC-245fa) and/or 1,1,1,3,3-pentafluorobutane (HFC-365mfc) is used, and as the catalyst, a reactive amine compound having at least one type of substituent selected from the group consisting of a hydroxyl group, a primary amino group and a secondary amino group in its molecule, or N-(2-dimethylaminoethyl)-N'-methylpiperazine, is used.

Polyurethane foams are widely used as flexible foams to be used for seat cushions for automobiles, mattresses, furnitures, etc., as semi-rigid foams to be used for instrument panels for automobiles, headrests, arm rests, etc., and as rigid foams to be used for electrical refrigerators, building materials, etc.

In recent years, in the production of rigid polyurethane foams, it has been strongly required to improve the flowability and thermal conductivity of the foams with a view to reducing costs and saving energy. The reactions for forming a polyurethane foam mainly comprise two reactions i.e. a urethane group-forming reaction (gelling reaction) by a reaction of a polyol with an isocyanate, and a urea group-forming and carbon dioxide gas-forming reaction (blowing reaction) by a reaction of an isocyanate with water, wherein the catalyst gives a substantial influence not only over the rates of these reactions but also over the flowability, thermal conductivity, moldability, dimensional stability, physical properties, etc., of the foam.

In the production of rigid polyurethane foams, dichloromonofluoroethanes (HCFCs) used to be employed as blowing agents. However, they have a problem of destroying the ozone layer. Under these circumstances, as a blowing agent to be substituted for them, 1,1,1,3,3-pentafluoropropane (HFC-245fa) or 1,1,1,3,3-pentafluorobutane (HFC-365mfc) has been proposed in recent years, which is free from the problem of destroying the ozone layer. Further, as a catalyst for the production of polyurethanes, it has been common to employ an organic metal catalyst or a tertiary amine catalyst, and it has been commonly known that the tertiary amine catalyst can be an excellent catalyst for the production of polyurethanes. Among tertiary amine compounds, those industrially used as catalysts for the production of polyurethanes include, for example, triethylene diamine, N,N,N',N'-tetramethyl-1,6-hexanediamine, bis(2-dimethylaminoethyl)ether, N,N,N',N'',N''-pentamethyldiethylenetriamine, N-methylmorpholine, and N-ethylmorpholine.

However, each of HFC-245fa and HFC-365mfc is hardly soluble in a polyol and is expensive, as compared with HCFC, etc., and accordingly, it can be used only in a small amount as mixed. Therefore, in a case where HFC-245fa or HFC-365mfc is used as a blowing agent, when the above-mentioned tertiary amine catalyst is employed, the amount of water to be used increases, and there will be a problem that the foam tends to be inferior in the flowability and thermal conductivity as compared with a rigid polyurethane foam obtained by using conventional HCFC or the like as the blowing agent. It has been strongly desired to overcome such a problem.

The present invention has been made in view of the above problems, and it is an object of the present invention to provide a method for producing a rigid polyurethane foam, employing a catalyst which is capable of improving the flowability, thermal conductivity, moldability and dimensional stability of the foam, even when HFC-245fa or HFC-365mfc is used as the blowing agent.

The present inventors have conducted an extensive study to solve the above problems and as a result, have found that in a case where HFC-245fa or HFC-365mfc is used as a blowing agent, a rigid polyurethane foam excellent in the flowability, thermal conductivity, moldability and dimensional stability of the foam, can be obtained by using, as an amine catalyst, an amine compound having at least one type of substituent selected from the group consisting of a hydroxyl group, a primary amino group and a secondary amino group, or N-(2-dimethylaminoethyl)-N'-methylpiperazine. The present invention has been accomplished on the basis of this discovery.

That is, the present invention provides a method for producing a rigid polyurethane foam, which comprises reacting a polyol with a polyisocyanate in the presence of an amine catalyst and a blowing agent, wherein as the amine catalyst, an amine compound having at least one type of substituent selected from the group consisting of a hydroxyl group, a primary amino group and a secondary amino group in its molecule, or N-(2-dimethylaminoethyl)-N'-methylpiperazine, is used, and as the blowing agent, 1,1,1,3,3-pentafluoropropane (HFC-245fa) and/or 1,1,1,3,3-pentafluorobutane (HFC-365mfc) is used.

Now, the present invention will be described in detail with reference to the preferred embodiments.

In the present invention, the rigid polyurethane foam means a thermosetting foam having a highly crosslinked closed cell structure, as disclosed by Gunter Oertel, "Polyurethane Handbook" (1985), Hanser Publishers (Germany), p. 234–313 or Keiji Iwata "Polyurethane Resin Handbook" (1987), Nikkan Kogyo Shinbunsha, p. 224–283. The physical properties of the rigid urethane foam are not particularly limited. However, usually, the density is from 10 to 100 kg/m$^3$, and the compression strength is within a range of from 50 to 1,000 kPa.

In the present invention, the amine compound to be used as the catalyst, is an amine compound having at least one type of substituent selected from the group consisting of a hydroxyl group, a primary amino group and a secondary amino group in its molecule, or N-(2-dimethylaminoethyl)-N'-methylpiperazine.

In the method of the present invention, the amine compound having at least one type of substituent selected from the group consisting of a hydroxyl group, a primary amino group and a secondary amino group in its molecule, is preferably an amine compound of the following formula (1):

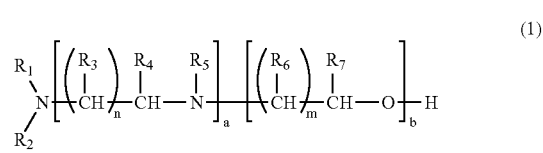

wherein each of $R_1$ to $R_7$ which are independent of one another, is hydrogen, a $C_{1-16}$ alkyl group, a $C_{1-16}$ aryl group, a $C_{2-6}$ hydroxyalkyl group, a $C_{2-6}$ aminoalkyl group, a $C_{2-6}$ monomethylaminoalkyl group or a $C_{2-6}$ dimethylaminoalkyl group, each of n and m which are independent of each other, is an integer of from 1 to 11, and each of a and b which are independent of each other, is an integer of from 0 to 5, provided that $R_5$ and $R_1$ or $R_2$ may together form a cyclic compound having a piperazine structure, an imidazole structure or an imidazoline structure, or an amine compound of the following formula (2):

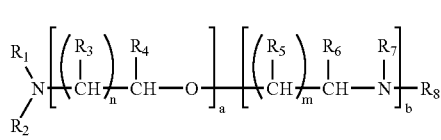

(2)

wherein each of $R_1$ to $R_8$ which are independent of one another, is hydrogen, a $C_{1-16}$ alkyl group, a $C_{1-16}$ aryl group, a $C_{2-6}$ hydroxyalkyl group, a $C_{2-6}$ aminoalkyl group, a $C_{2-6}$ monomethylaminoalkyl group, a $C_{2-6}$ dimethylaminoalkyl group or

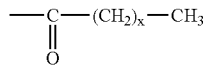

wherein x is an integer of from 0 to 3, each of n and m which are independent of each other, is an integer of from 1 to 11, and each of a and b which are independent of each other, is an integer of from 0 to 10, provided that $R_7$ and $R_1$ or $R_2$ may together form a cyclic compound having a piperazine structure, an imidazole structure or an imidazoline structure.

In the amine compound of the above formula (1), each of $R_1$ to $R_7$ which are independent of one another, is preferably hydrogen atom, a methyl group, a hydroxyethyl group, a hydroxypropyl group, an aminoethyl group, an aminopropyl group, a monomethylaminoethyl group, a monomethylaminopropyl group, a dimethylaminoethyl group or a dimethylaminopropyl group, provided that $R_5$ and $R_1$ or $R_2$ may together form a cyclic compound having a piperazine structure.

Further, in the amine compound of the above formula (2), each of $R_1$ to $R_8$ which are independent of one another, is preferably a hydrogen atom, a methyl group, a hydroxyethyl group, a hydroxypropyl group, an aminoethyl group, an aminopropyl group, a monomethylaminoethyl group, a monomethylaminopropyl group, a dimethylaminoethyl group, a dimethylaminopropyl group or an acetyl group, provided that $R_7$ and $R_1$ or $R_2$ may together form a cyclic compound having a piperazine structure.

The amine catalyst to be used in the present invention is not particularly limited, so long as it belongs to the above-mentioned amine compounds. Specifically, it may, for example, be a primary amine compound, such as N,N-dimethylethylenediamine, N,N-dimethylpropylenediamine, N,N-dimethyltetramethylenediamine, N,N-dimethylpentamethylenediamine, N,N-dimethylhexamethylenediamine, N,N-dimethylheptamethylenediamine, N,N-dimethyloctamethylenediamine, N,N-dimethylnonamethylenediamine, N,N-dimethyldecamethylenediamine, N-methylethylenediamine, N-methylpropylenediamine, N-methyltetramethylenediamine, N-methylpentamethylenediamine, N-methylhexamethylenediamine, N-methylheptamethylenediamine, N-methyloctamethylenediamine, N-methylnonamethylenediamine, N-methyldecamethylenediamine, N-acetylethylenediamine, N-acetylpropylenediamine, N-acetyltetramethylenediamine, N-acetylpentamethylenediamine, N-acetylhexamethylenediamine, N-acetylheptamethylenediamine, N-acetyloctamethylenediamine, N-acetylnonamethylenediamine, N-acetyldecamethylenediamine, N,N,N'-trimethyldiethylenetriamine, N,N,N',N''-tetramethyltriethylenetetramine, N,N,N',N'',N'''-petamethyltetraethylenepentamine, N,N,N',N'',N''',N''''-hexamethylpentaethylenehexamine, polyoxyethylenediamine of the formula:

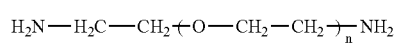

or polyoxypropylene diamine of the formula:

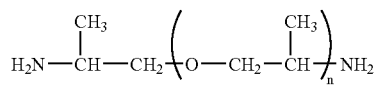

a secondary amine compound, such as trimethylethylenediamine, trimethylpropylenediamine, trimethyltetramethylenediamine, trimethylpentamethylenediamine, trimethylhexamethylenediamine, trimethylheptamethylenediamine, trimethyloctamethylenediamine, trimethylnonamethylenediamine, trimethyldecamethylenediamine, tetramethyldiethylenetriamine, pentamethyltriethylenetetramine, hexamethyltetraethylenepentamine, heptamethylpentaethylenehexamine, bis(N,N-dimethylaminopropyl)amine or N-methylpiperazine; or an alkanol amine, such as N,N-dimethylaminoethanol, N,N-dimethylaminoisopropanol, N,N-dimethylaminoethoxyethanol, N,N-dimethylaminoethoxyisopropanol, N,N-dimethylaminoethoxyethoxyethanol, N,N-dimethylaminoethoxyethoxyisopropanol, N,N-dimethylaminoethyl-N'-methylaminoethanol, N,N-dimethylaminoethyl-N'-methylaminoisopropanol, N,N-dimethylaminopropyl-N'-methylaminoethanol, N,N-dimethylaminopropyl-N'-methylaminoisopropanol, N,N-dimethyl-N'-(2-hydroxyethyl)ethylenediamine, N,N-dimethyl-N'-(2-hydroxyethyl)propanediamine, N,N,N'-trimethyl-N'-hydroxyethylbisaminoethyl ether, N,N,N'-trimethyl-N'-hydroxyisopropylbisaminoethyl ether, N,N-dimethylaminoethyl-N'-methylaminoethyl-N''-methylaminoethanol, N,N-dimethylaminoethyl-N'-methylaminoethyl-N''-methylaminoisopropanol, N,N-dimethylaminoethyl-N'-methylaminoethyl-N''-methylaminoethyl-N'''-methylaminoethanol, N,N-dimethylaminoethyl-N'-methylaminoethyl-N''-methylaminoethyl-N'''-methylaminoisopropanol, N,N-bis(3-dimethylaminopropyl)-N-isopropanolamine, N-(3-dimethylaminopropyl)-N,N-diisopropanolamine, N-(2-hydroxyethyl)-N'-methylpiperazine, N,N-dimethylaminohexanol, 5-dimethylamino-3-methyl-1-pentanol, 1-(2'-hydroxyethyl)imidazole, 1-(2'-hydroxypropyl)imidazole, 1-(2'-hydroxvethyl)-2-methylimidazole or 1-(2'-hydroxypropyl)-2-methylimidazole.

Among these amine compounds, particularly preferred from the viewpoint of high catalytic activities are, as a primary amine compound, N,N-dimethylethylenediamine, N,N-dimethylpropylenediamine, N,N-dimethylhexamethylenediamine, N-acetylethylenediamine, N,N,N'-trimethyldiethylenetriamine, N,N,N',N''-tetramethyltriethylenetetramine, N,N,N',N'',N'''-pentamethyltetraethylenepentamine, N,N,N',N'',N''',N''''-hexamethylpentaethylenehexamine or polyoxypropylenediamine; as a secondary amine compound, trimethylethylenediamine, trimethylpropylenediamine, trimethylhexamethylenediamine, tetramethyldiethylenetriamine, bis(N,N-dimethylaminopropyl)amine or N-methylpiperazine; and as an alkanol amine, N,N-dimethylaminoethanol, N,N-dimethylaminoisopropanol, N,N-dimethylaminoethoxyethanol, N,N-dimethylaminoethyl-N'-methylaminoethanol, N,N-dimethylaminopropyl-N'-methylaminoethanol, N,N,N'-trimethyl-N'-hydroxyethylbisaminoethyl ether, N,N-dimethylaminoethyl-N'-methylaminoethyl-N''-methylaminoisopropanol, N,N-bis(3-dimethylaminopropyl)-N-isopropanolamine, N-(3-dimethylaminopropyl)-N,N-diisopropanolamine, N-(2-hydroxyethyl)-N'-methylpiperazine, N,N-dimethylaminohexanol or 5-dimethylamino-3-methyl-1-pentanol.

The amine compound of the above formula (1) to be used as the amine catalyst of the present invention can easily be produced by methods known in literatures. For example, a method of reacting a diol with a diamine or reduction methylation of a monoamino alcohol or a diamine, may be mentioned.

Further, the amine compound of the above formula (2) to be used as the amine catalyst of the present invention, can easily be produced by methods known in literatures. For example, a method of reacting a diol with a diamine, a method of amination of an alcohol, or a method of reduction methylation of a monoamino alcohol or a diamine, may be mentioned.

Further, N-(2-dimethylaminoethyl)-N'-methylpiperazine as the catalyst of the present invention, can easily be produced by methods known in literatures. For example, a method of reduction methylation of N-(2-aminoethyl)piperazine or a method of reacting N-methylpiperazine with 2-(dimethylamino)ethyl chloride, may be mentioned.

The amount of the amine catalyst used in the present invention is usually within a range of from 0.01 to 20 parts by weight, preferably from 0.05 to 10 parts by weight, per 100 parts by weight of the polyol used. If it is less than 0.01 part by weight, the moldability of the foam tends to deteriorate, and the dimensional stability is likely to be poor. On the other hand, if it exceeds 20 parts by weight, not only the effect of the increase of the catalyst can not be obtained, but the flowability of the foam is likely to be poor.

The amine catalyst to be used in the method for producing a polyurethane of the present invention, is the above-mentioned amine compound, but other catalyst may be used in combination within a range not to depart from the present invention. As such other catalyst, a conventional organic metal catalyst, a metal salt of a carboxylic acid, a tertiary amine or a quarternary ammonium salt, may, for example, be mentioned.

The organic metal catalyst is not particularly limited so long as it is a conventional one. For example, stannous diacetate, stannous dioctoate, stannous dioleate, stannous dilaurate, dibutyltin oxide, dibutyltin diacetate, dibutyltin dilaurate, dibutyltin dichloride, dioctyltin dilaurate, lead octanoate, lead naphthenate, nickel naphthenate or cobalt naphthenate may be mentioned.

The metal salt of a carboxylic acid may be any conventional one. For example, an alkali metal salt or an alkaline earth metal salt of a carboxylic acid may be mentioned. The carboxylic acid is not particularly limited and may, for example, be an aliphatic mono or dicarboxylic acid such as acetic acid, propionic acid, 2-ethylhexanoic acid or adipic acid, or an aromatic mono or dicarboxylic acid such as benzoic acid or phthalic acid. Further, as the metal to form the carboxylate, an alkali metal such as lithium, sodium or potassium, or an alkaline earth metal such as calcium or magnesium may be mentioned as a preferred example.

The tertiary amine may be a conventional one and is not particularly limited. For example, a tertiary amine compound such as N,N,N',N'-tetramethylethylenediamine, N,N,N',N',-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, N,N,N',N'-tetramethylguanidine, 1,3,5-tris(N,N-dimethylaminopropyl) hexahydro-S-triazine, 1,8-diazabicyclo[5.4.0]undecene-7, triethylenediamine, N,N,N',N'-tetramethylhexamethylenediamine, N,N'-dimethylpiperazine, dimethylcyclohexylamine, N-methylmorpholine, N-ethylmorpholine, bis(2-dimethylaminoethyl)ether, 1-methylimidazole, 1,2-dimethylimidazole, 1-isobutyl-2-methylimidazole or 1-dimethylaminopropylimidazole, may be mentioned.

The quaternary ammonium salt may be a conventional one and is not particularly limited. For example, a tetraalkylammonium halide such as tetramethylammonium chloride, a tetraalkylammonium hydroxide such as tetramethylammonium hydroxide, or a tetraalkylammonium organic acid salt, such as tetramethylammonium 2-ethylhexanoate, 2-hydroxypropyltrimethylammonium formate or 2-hydroxypropyltrimethylammonium 2-ethylhexanoate, may be mentioned.

The amine catalyst of the present invention may be used alone or in combination with other catalysts, as described above. To prepare the mixture, the solvent such as dipropylene glycol, ethylene glycol, 1,4-butanediol or water, may be used, as the case requires. The amount of the solvent is not particularly limited, but preferably at most 3 times by weight relative to the total amount of the catalyst. If it exceeds 3 times by weight, it tends to influence the physical properties of the foam, and such is not desirable also from the economical reason. The catalyst thus prepared, may be used as added to the polyol, or various amine catalysts may be added separately to the polyol. There is no particular restriction as to the manner of its addition.

The polyol to be used in the method of the present invention, includes, for example, conventional polyether polyols, polyester polyols, polymer polyols and further flame resisting polyols such as phosphorus-containing polyols or halogen-containing polyols. These polyols may be used alone or in a proper combination as mixed.

The polyether polyols to be used in the method of the present invention, can be produced, for example, by an addition reaction of an alkylene oxide such as ethylene oxide or propylene oxide to a starting material which is a compound having at least two active hydrogen groups, such as a polyhydric alcohol such as ethylene glycol, propylene glycol, glycerol, trimethylol propane or pentaerythritol, an amine such as ethylenediamine, or an alkanolamine such as ethanolamine or diethanolamine, for example, by a method disclosed in "Polyurethane Handbook" edited by Gunter Oertel (1985), Hanser Publishers (Germany), p. 42–53.

The polyester polyols to be used in the method of the present invention, may, for example, be those obtainable by a reaction of a dibasic acid with glycol, further a waste during production of nylon as disclosed in "Polyurethane Resin Handbook" edited by Keiji Iwata, (first edition published in 1987), THE NIKKAN KOGYO SHIMBUN, LTD., p. 117, trimethylolpropane, a waste of pentaerythritol, a waste of a phchalate type polyester, and polyester polyols derived from treatments of such waste products.

The polymer polyols to be used in the method of the present invention, may, for example, be polymer polyols obtained by reacting the above-mentioned polyether polyol with an ethylenically unsaturated monomer such as butadiene, acrylonitrile or styrene, in the presence of a radical polymerization catalyst.

The flame resisting polyols to be used in the method of the present invention, may, for example, be phosphorus-containing polyols obtainable by adding an alkylene oxide to a phosphoric acid compound, halogen-containing polyols obtainable by ring opening polymerization of epichlorohydrin or trichlorobutylene oxide, and phenol polyols.

In the method of the present invention, a polyol having an average hydroxyl value of from 100 to 800 mgKOH/g is preferred. Further preferred is a polyol having an average hydroxyl value of from 200 to 700 mgKOH/g.

The polyisocyanate to be used in the present invention may be a conventional polyisocyanate and is not particularly limited, and it may, for example, be an aromatic polyisocyanate such as toluene diisocyanate (TDI), diphenylmethane diisocyanate (MDI), naphthylene diisocyanate or xylylene duisocvanate, an aliphatic polyisocyanate such as hexamethylene diisocyanate, an alicyclic polyisocyanate such as dicyclohexyl diisocyanate or isophorone diisocyanate, or a mixture thereof. Among them, preferred is TDI or its derivative, or MDI or its derivative, and they may be used in combination as a mixture. As TDI or its derivative, a mixture of 2,4-TDI and 2,6-TDI, or a terminal isocyanate prepolymer derivative of TDI, may be mentioned. As MDI or its derivative, a mixture of MDI and its polymer i.e. a polyphenyl-polymethylene diisocyanate, and/or a terminal isocyanate group-containing diphenylmethane diisocyanate derivative, may be mentioned.

The ratio of such a polyisocyanate to the polyol is not particularly limited, but, as represented by an isocyanate index (i.e. isocyanate groups/active hydrogen groups reactive with isocyanate groups), it is usually preferably within a range of from 60 to 400.

The blowing agent to be used in the method of the present invention is 1,1,1,3,3-pentafluoropropane (HFC-245fa) and/or 1,1,1,3,3-pentafluorobutane (HFC-365mfc). A mixture of HFC-245fa with water and/or a low boiling point hydrocarbon, or a mixture of HFC-365mfc with water and/or a low boiling point hydrocarbon, may also be used.

As the low boiling point hydrocarbon, a hydrocarbon having a boiling point of from 0 to 70° C. is usually employed. Specifically, it may, for example, be propane, butane, pentane, cyclopentane, hexane or HFC-227 such as 1,1,1,2,3,3,3-heptafluoropropane (HFC-227ea), HFC-134 such as 1,1,1,2-tetrafluoroethane (HFC-134a), or a mixture thereof.

The amount of the blowing agent is determined depending upon the desired density and physical properties of the foam. Specifically, it is selected so that the density of the obtained foam will usually be from 10 to 200 kg/m$^3$, preferably from 20 to 100 kg/m$^3$.

In the present invention, a surfactant may be used as a foam stabilizer, as the case requires. As the surfactant to be used, a conventional organic silicon type surfactant may, for example, be mentioned. Specifically, a nonionic surfactant such as an organic siloxane-polyoxyalkylene copolymer or a silicone-grease copolymer, or a mixture thereof, may, for example, be mentioned. The amount of such a surfactant is usually from 0.1 to 10 parts by weight per 100 parts by weight of the polyol.

In the present invention, a cross-linking agent or a chain extender may be incorporated, as the case requires. As the cross-linking agent or the chain extender, a polyhydric alcohol having a low molecular weight such as ethylene glycol, 1,4-butanediol or glycerol, an amine polyol having a low molecular weight such as diethanolamine or triethanolamine, or a polyamine such as ethylenediamine, xylylenediamine or methylenebis orthochloroaniline, may, for example, be mentioned.

In the method of the present invention, a flame retardant may be employed, as the case requires. The flame retardant to be used may, for example, be a reactive flame retardant such as a phosphorus-containing polyol such as propoxylated phosphoric acid or propoxylated dibutylpyrophosphoric acid obtained by an addition reaction of phosphoric acid with an alkylene oxide, a tertiary phosphate such as tricresyl phosphate, a halogen-containing tertiary phosphate such as tris(2-chloroethyl) phosphate or tris(chloropropyl) phosphate, a halogen-containing organic compound such as dibromopropanol, dibromoneopentyl glycol or tetrabromobisphenol A, or an inorganic compound such as antimony oxide, magnesiumn carbonate, calcium carbonate or aluminum phosphate. Its amount is not particularly limited and may vary depending upon the required flame retardancy. However, it is usually from 4 to 20 parts by weight per 100 parts by weight of the polyol.

In the method of the present invention, a coloring agent, an aging-preventive agent or other known additives may also be incorporated, as the case requires. The types and the amounts of such additives may be usual ranges of such additives.

The method of the present invention is carried out by rapidly mixing and stirring a mixed liquid having the above starting materials, then injecting it into a suitable container or mold, followed by foaming and molding. The mixing and stirring may be carried out by means of a common stirrer or an exclusive polyurethane foaming machine. As the polyurethane foaming machine, a high pressure, low pressure or spray type machine can be used.

The product produced by the method of the present invention can be used for various applications. For example, it may be applied to a refrigerator, a freezer or a heat-insulating building material.

Now, the present invention will be described in further detail with reference to Examples and Comparative Examples. However, it should be understood that the present invention is by no means restricted to such specific Examples.

In the following Examples and Comparative Examples, the measuring methods for various measured items were as follows.

Measured Items for the Reactivity

Cream time: The time until the foam started to rise, was visually measured.

Gel time: As the reaction proceeded, the time until the liquid substance was changed to the resin substance, was measured.

Tack free time: The time until tackiness on the foam surface disappeared, was measured.

Rise time: The time until the rise of foam terminated, was measured by visual observation.

Flowability of the Foam

A predetermined amount of a mixed liquid was injected into an aluminum mold of 100×25×3.0 cm, and the length (cm) of the formed foam was measured. The longer the length of the foam, the better the flowability.

Core Density of the Foam

Free foaming was carried out by means of an aluminum mold of 50×50×4.5 cm, and the center portion of the formed foam was cut into a size of 20×20×3.0 cm, and the size and the weight were accurately measured, whereupon the core density was calculated.

Thermal Conductivity of the Foam

The center portion of a foam foamed in an aluminum mold of 50×50×4.5 cm was cut into a size of 20×20×3.0 cm to obtain a test specimen, which was measured by ANACON model 88.

Dimensional Stability of the Foam

A foam foamed in an aluminum mold of 50×50×4.5 cm was held under a condition of −30° C.×48 hours, whereby the change in the thickness direction was measured.

EXAMPLES 1 TO 6 AND COMPARATIVE EXAMPLES 1 TO 5

The polyol, the blowing agent and surfactant were mixed in the mixing ratio as shown in Table 1 to prepare premix A. 48.6 g of premix A was taken into a 300 ml polyethylene cup, and the catalyst shown in Table 1, was added in an amount such that the reactivity would be 60 seconds as represented by the following gel time, and the temperature was adjusted to 10° C. A polyisocyanate liquid (MR-200) having the temperature adjusted to 10° C. in a separate container, was put into the cup of premix A in an amount such that the isocyanate index (molar ratio of isocyanate groups/OH groups×100) would be 110, and quickly stirred by a stirrer at 6,500 rpm for 3 seconds. The mixed solution obtained by stirring was transferred to a 2 l polyethylene cup adjusted to a temperature of 40° C., whereupon the reactivity during foaming was measured. Then, the starting material scale was increased, and the mixed solution was put into a mold adjusted to a temperature of 40° C. in the same manner, and foam molding was carried out. Upon expiration of 10 minutes from the time when the mixed solution was introduced, the foam was removed from the mold. From the molded foam, the flowability, the core density, the thermal conductivity and the dimensional stability of the foam, were evaluated. The results are shown in Table 2.

TABLE 1

|  |  | Examples |  |  |  |  |  | Comparative Examples |  |  |  |  |  |  |
|---|---|---|---|---|---|---|---|---|---|---|---|---|---|---|
|  |  | 1 | 2 | 3 | 4 | 5 | 6 | 1 | 2 | 3 | 4 | 5 | 6 | 7 |
| Mixing ratio (parts by weight) | Premix A |  |  |  |  |  |  |  |  |  |  |  |  |  |
|  | Polyol[1] | 100 | 100 | 100 | 100 | 100 | 100 | 100 | 100 | 100 | 100 | 100 | 100 | 100 |
|  | HFC-245fa | 35 | 35 | 35 | 35 | 35 | 35 | 35 | 35 | 35 | 35 | 35 |  |  |
|  | HCFC-141b |  |  |  |  |  |  |  |  |  |  |  | 35 | 35 |
|  | Water | 1.8 | 1.8 | 1.8 | 1.8 | 1.8 | 1.8 | 1.8 | 1.8 | 1.8 | 1.8 | 1.8 | 1.8 | 1.8 |
|  | Surfactant[2] | 2.0 | 2.0 | 2.0 | 2.0 | 2.0 | 2.0 | 2.0 | 2.0 | 2.0 | 2.0 | 2.0 | 2.0 | 2.0 |
|  | Amine catalyst |  |  |  |  |  |  |  |  |  |  |  |  |  |
|  | Catalyst A[3] | 5.5 |  |  |  |  |  |  |  |  |  |  | 4.8 |  |
|  | Catalyst B[4] |  | 5.0 |  |  |  |  |  |  |  |  |  |  | 5.0 |
|  | Catalyst C[5] |  |  | 6.0 |  |  |  |  |  |  |  |  |  |  |
|  | Catalyst D[6] |  |  |  | 5.2 |  |  |  |  |  |  |  |  |  |
|  | Catalyst E[7] |  |  |  |  | 5.0 |  |  |  |  |  |  |  |  |
|  | Catalyst F[8] |  |  |  |  |  | 7.0 |  |  |  |  |  |  |  |
|  | Catalyst G[9] |  |  |  |  |  |  | 4.8 |  | 3.0 |  |  |  |  |
|  | Catalyst H[10] |  |  |  |  |  |  |  | 6.5 |  | 3.2 |  |  |  |
|  | Catalyst I[11] |  |  |  |  |  |  |  |  | 1.0 | 1.1 |  |  |  |
|  | Catalyst J[12] |  |  |  |  |  |  |  |  |  |  | 5.9 |  |  |
|  | Isocyanate INDEX[13] | 110 | 110 | 110 | 110 | 110 | 110 | 110 | 110 | 110 | 110 | 110 | 110 | 110 |

|  |  | Comparative Examples |  |  |  |  |  |  |
|---|---|---|---|---|---|---|---|---|
|  |  | 8 | 9 | 10 | 11 | 12 | 13 | 14 |
| Mixing ratio (parts by weight) | Premix A |  |  |  |  |  |  |  |
|  | Polyol[1] | 100 | 100 | 100 | 100 | 100 | 100 | 100 |
|  | HFC-245fa |  |  |  |  |  |  |  |
|  | HCFC-141b | 35 | 35 | 35 | 35 | 35 | 35 | 35 |
|  | Water | 1.8 | 1.8 | 1.8 | 1.8 | 1.8 | 1.8 | 1.8 |
|  | Surfactant[2] | 2.0 | 2.0 | 2.0 | 2.0 | 2.0 | 2.0 | 2.0 |

TABLE 1-continued

Amine catalyst

| | | | | | | | |
|---|---|---|---|---|---|---|---|
| Catalyst A[3] | | | | | | | |
| Catalyst B[4] | | | | | | | |
| Catalyst C[5] | 6.0 | | | | | | |
| Catalyst D[6] | | 5.5 | | | | | |
| Catalyst E[7] | | | 3.9 | | | | |
| Catalyst F[8] | | | | | | | |
| Catalyst G[9] | | | | 3.1 | | 1.5 | |
| Catalyst H[10] | | | | | 4.5 | | |
| Catalyst I[11] | | | | | | 0.5 | |
| Catalyst J[12] | | | | | | | 3.3 |
| Isocyanate INDEX[13] | 110 | 110 | 110 | 110 | 110 | 110 | 110 |

[1] Sucrose/aromatic amine type polyether polyol (OH value = 440 mgKOH/g), manufactured by Asahi Glass Company, Limited
[2] Silicone type surfactant (Tradename: SZ-1627), manufactured by Nippon Unicar Company Limited
[3] N,N-dimethylaminoethoxyethanol (manufactured by TOSOH CORPORATION)
[4] N,N,N'-trimethylaminoethylethanolamine (manufactured by TOSOH CORPORATION)
[5] N,N,N'-trimethyldiethylenetriamine (product prepared by reduction methylation of diethylene triamine)
[6] N,N-dimethylaminoethyl-N'-methylaminoethyl-N''-methylaminoisopropanol (product obtained by adding propylene oxide to diethylene triamine, followed by reduction methylation)
[7] N,N-dimethylpropylenediamine (manufactured by TOSOH CORPORATION)
[8] Bis(N,N-dimethylaminopropyl)amine (manufactured by Aldrich)
[9] N,N,N',N'-tetramethylhexamethylenediamine (Tradename: TOYOCAT-MR, manufactured by TOSOH CORPORATION)
[10] N,N-dimethylcyclohexylamine (manufactured by Aldrich)
[11] N,N,N',N',N''-pentamethyldiethylenetriamine (tradename: TOYOCAT-DT, manufactured by TOSOH CORPORATION)
[12] Triethylenediamine 33 wt % ethylene glycol solution (tradename: TEDA-L33, manufactured by TOSOH CORPORATION)
[13] CrudeMDI(MR-200), INDEX = (mols of NCO groups/mols of OH groups) × 100, manufactured by Nippon Polyurethane Industry Co., Ltd.

TABLE 2

| | Examples | | | | | | Comparative Examples | | | | | | |
|---|---|---|---|---|---|---|---|---|---|---|---|---|---|
| | 1 | 2 | 3 | 4 | 5 | 6 | 1 | 2 | 3 | 4 | 5 | 6 | 7 |
| Reactivity (seconds) | | | | | | | | | | | | | |
| Cream time | 6 | 6 | 7 | 7 | 6 | 7 | 11 | 11 | 7 | 6 | 15 | 9 | 9 |
| Gel time | 60 | 60 | 60 | 60 | 62 | 59 | 59 | 60 | 59 | 58 | 60 | 61 | 60 |
| Tack free time | 100 | 90 | 95 | 90 | 90 | 96 | 64 | 72 | 66 | 69 | 65 | 82 | 72 |
| Rise time | 105 | 95 | 105 | 96 | 93 | 103 | 73 | 82 | 77 | 79 | 77 | 93 | 89 |
| Physical properties of foam | | | | | | | | | | | | | |
| Flowability (cm) | 80 | 80 | 78 | 79 | 81 | 80 | 74 | 75 | 76 | 76 | 72 | 78 | 78 |
| Core density (kg/m$^3$) | 26.0 | 26.1 | 26.3 | 26.3 | 25.8 | 26.0 | 26.3 | 26.1 | 25.6 | 25.8 | 26.8 | 26.2 | 26.0 |
| Thermal conductivity (mW/mK) | 18.1 | 18.4 | 18.2 | 18.5 | 18.0 | 18.3 | 19.2 | 19.2 | 19.4 | 19.4 | 19.8 | 18.8 | 19.1 |
| Dimensional stability (%) | −0.8 | −0.9 | −0.7 | −1.0 | −1.0 | −0.9 | −4.8 | −2.8 | −6.9 | −0.8 | −5.8 | −1.3 | −1.0 |

| | Comparative Examples | | | | | | |
|---|---|---|---|---|---|---|---|
| | 8 | 9 | 10 | 11 | 12 | 13 | 14 |
| Reactivity (seconds) | | | | | | | |
| Cream time | 10 | 10 | 12 | 16 | 13 | 11 | 21 |
| Gel time | 60 | 60 | 60 | 61 | 61 | 59 | 60 |
| Tack free time | 77 | 73 | 74 | 74 | 76 | 79 | 71 |
| Rise time | 90 | 92 | 90 | 86 | 92 | 92 | 86 |
| Physical properties of foam | | | | | | | |
| Flowability (cm) | 77 | 79 | 77 | 78 | 80 | 81 | 73 |
| Core density (kg/m$^3$) | 26.5 | 26.5 | 26.7 | 26.8 | 26.5 | 29.7 | 26.0 |
| Thermal conductivity (mW/mK) | 18.5 | 18.8 | 18.1 | 18.1 | 18.3 | 18.4 | 17.6 |
| Dimensional stability (%) | −0.8 | −0.9 | −1.0 | −1.0 | −0.7 | −0.9 | −0.3 |

COMPARATIVE EXAMPLES 6 TO 14

The polyol, the blowing agent and surfactant were mixed in the mixing ratio as shown in Table 1 to prepare premix A. 48.6 g of premix A was taken into a 300 ml polyethylene cup, and the catalyst shown in Table 1, was added in an amount such that the reactivity would be 60 seconds as represented by the following gel time, and the temperature was adjusted to 20° C. A polyisocyanate liquid (MR-200) having the temperature adjusted to 20° C. in a separate container, was put into the cup of premix A in an amount such that the isocyanate index (molar ratio of isocyanate groups/OH groups×100) would be 110, and quickly stirred by a stirrer at 6,500 rpm for 3 seconds. The mixed solution obtained by stirring was transferred to a 2 l polyethylene cup adjusted to a temperature of 40° C., whereupon the reactivity during foaming was measured. Then, the starting material scale was increased, and the mixed solution was put into a mold adjusted to a temperature of 40° C. in the same manner, and foam molding was carried out. Upon expiration of 10 minutes from the time when the mixed solution was introduced, the foam was removed from the mold. From the molded foam, the flowability, the core density, the thermal conductivity and the dimensional stability of the foam, were evaluated. The results are shown in Table 2.

As is evident from Table 2, in the method for producing a rigid polyurethane foam employing 1,1,1,3,3-pentafluoropropane (HFC-245fa) as a blowing agent, a foam excellent in the flowability, thermal conductivity and dimensional stability can be produced by using the amine compound of the present invention as a catalyst.

Namely, Examples 1 to 6 are Examples in which rigid polyurethane foams were produced by using the catalysts of the present invention. In each of them, a rigid urethane foam excellent in the flowability, thermal conductivity and dimensional stability, was obtained.

Whereas, Comparative Examples 1 to 5 are Examples employing tertiary amine catalysts having no hydroxyl group, primary amino group or secondary amino group in their molecules, wherein the obtained foams were inferior in the flowability and thermal conductivity. Further, Comparative Examples 6 to 14 are Examples in which 1,1-dichloro-1-fluoroethano (HCFC-141b) was used as a blowing agent, and even if the amine compounds of the present invention were used as the catalysts, no distinct effects were observed in the flowability, thermal conductivity and dimensional stability of the foams.

EXAMPLES 7 TO 16

The polyol, the blowing agent and surfactant were mixed in the mixing ratio as shown in Table 3 to prepare premix A. 48.6 g of premix A was taken into a 300 ml polyethylene cup, and the catalyst shown in Table 3, was added in an amount such that the reactivity would be 60 seconds as represented by the following gel time, and the temperature was adjusted to 10° C. A polyisocyanate liquid (MR-200) having the temperature adjusted to 10° C. in a separate container, was put into the cup of premix A in an amount such that the isocyanate index (molar ratio of isocyanaze groups/OH groups×100) would be 110, and quickly stirred by a stirrer at 6,500 rpm for 3 seconds. The mixed solution obtained by stirring was transferred to a 2 l polyethylene cup adjusted to a temperature of 40° C., whereupon the reactivity during foaming was measured. Then, the starting material scale was increased, and the mixed solution was put into a mold adjusted to a temperature of 40° C. in the same manner, and foam molding was carried out. Upon expiration of 10 minutes from the time when the mixed solution was introduced, the foam was removed from the mold. From the molded foam, the flowability, the core density, the thermal conductivity and the dimensional stability of the foam, were evaluated. The results are shown in Table 4.

TABLE 3

| | | Examples | | | | | | | | | |
|---|---|---|---|---|---|---|---|---|---|---|---|
| | | 7 | 8 | 9 | 10 | 11 | 12 | 13 | 14 | 15 | 16 |
| Mixing ratio | Premix A | | | | | | | | | | |
| (parts by weight) | Polyol[1] | 100 | 100 | 100 | 100 | 100 | 100 | 100 | 100 | 100 | 100 |
| | HFC-245fa | 35 | 35 | 35 | 35 | 35 | 35 | 35 | 35 | 35 | 35 |
| | HCFC-141b | | | | | | | | | | |
| | Water | 1.8 | 1.8 | 1.8 | 1.8 | 1.8 | 1.8 | 1.8 | 1.8 | 1.8 | 1.8 |
| | Surfactant[2] | 2.0 | 2.0 | 2.0 | 2.0 | 2.0 | 2.0 | 2.0 | 2.0 | 2.0 | 2.0 |
| | Amine catalyst | | | | | | | | | | |
| | Catalyst A[3] | 7.0 | | | | | | | | | |
| | Catalyst B[4] | | 8.5 | | | | | | | | |
| | Catalyst C[5] | | | 0.9 | | | | | | | |
| | Catalyst D[6] | | | | 3.2 | | | | | | |
| | Catalyst E[7] | | | | | 5.8 | | | | | |
| | Catalyst F[8] | | | | | | 4.8 | | | | |
| | Catalyst G[9] | | | | | | | 5.5 | | | |
| | Catalyst H[10] | | | | | | | | 8.0 | | |
| | Catalyst I[11] | | | | | | | | | 11.5 | |
| | Catalyst J[12] | | | | | | | | | | 6.4 |
| | Catalyst K[13] | | | 3.6 | 3.2 | | | | | | |
| | Isocyanate INDEX[14] | 110 | 110 | 110 | 110 | 110 | 110 | 110 | 110 | 110 | 110 |

| | | Comparative Examples | | | | | | | | | |
|---|---|---|---|---|---|---|---|---|---|---|---|
| | | 15 | 16 | 17 | 18 | 19 | 20 | 21 | 22 | 23 | 24 |
| Mixing ratio | Premix A | | | | | | | | | | |
| (parts by weight) | Polyol[1] | 100 | 100 | 100 | 100 | 100 | 100 | 100 | 100 | 100 | 100 |
| | HFC-245fa | | | | | | | | | | |
| | HCFC-141b | 35 | 35 | 35 | 35 | 35 | 35 | 35 | 35 | 35 | 35 |
| | Water | 1.8 | 1.8 | 1.8 | 1.8 | 1.8 | 1.8 | 1.8 | 1.8 | 1.8 | 1.8 |
| | Surfactant[2] | 2.0 | 2.0 | 2.0 | 2.0 | 2.0 | 2.0 | 2.0 | 2.0 | 2.0 | 2.0 |
| | Amine catalyst | | | | | | | | | | |
| | Catalyst A[3] | 4.8 | | | | | | | | | |
| | Catalyst B[4] | | 5.7 | | | | | | | | |
| | Catalyst C[5] | | | 0.6 | | | | | | | |
| | Catalyst D[6] | | | | 2.2 | | | | | | |
| | Catalyst E[7] | | | | | 3.8 | | | | | |

TABLE 3-continued

|  |  |  |  |  |  |  |  |  |  |  |
|---|---|---|---|---|---|---|---|---|---|---|
| Catalyst F[8) |  |  |  |  |  | 3.2 |  |  |  |  |
| Catalyst G[9) |  |  |  |  |  |  | 3.6 |  |  |  |
| Catalyst H[10) |  |  |  |  |  |  |  | 5.5 |  |  |
| Catalyst I[11) |  |  |  |  |  |  |  |  | 7.7 |  |
| Catalyst J[12) |  |  |  |  |  |  |  |  |  | 4.3 |
| Catalyst K[13) |  |  | 2.4 | 2.2 |  |  |  |  |  |  |
| Isocyanate INDEX[14) | 110 | 110 | 110 | 110 | 110 | 110 | 110 | 110 | 110 | 110 |

[1)Sucrose/aromatic amine type polyether polyol (OH value = 440 mgKOH/g), manufactured by Asahi Glass Company, Limited
[2)Silicone type surfactant (Tradename: SZ-1627), manufactured by Nippon Unicar Company Limited
[3)N,N-dimethylaminoethanol (manufactured by Aldrich)
[4)N,N-dimethylaminoisopropanol (manufactured by Aldrich)
[5)N-acetylethylenediamine (manufactured by TOKYO KASEI KOGYO Co., Ltd.)
[6)Polyoxypropylenediamine (product prepared by amination of polyethylene glycol, n = 2.6)
[7)N,N-dimethylaminopropyl-N'-methylaminoethanol (product obtained by adding ethylene oxide to diaminoethylether, followed by reduction methylation)
[8)N,N,N'-trimethyl-N'-hydroxyethylbisaminoethylether (manufactured by Aldrich)
[9)N,N-bis(3-dimethylaminopropyl)-N-isopropanolamine (product prepared by adding polypropylene oxide to bis(3-methylaminopropyl)amine)
[10)N-(3-dimethylaminopropyl)-N,N-diisopropanolamine (manufactured by Aldrich)
[11)N-(2-hydroxyethyl)-N'-methylpiperazine (tradename: TOYOCAT-HP, manufactured by TOSOH CORPORATION)
[12)N,N-dimethylaminohexanol (manufactured by TOKYO KASEI KOGYO Co., Ltd.)
[13)N,N,N',N'-tetramethylhexamethylenediamine (tradename: TOYOCAT-MR, manufactured by TOSOH CORPORATION)
[14)CrudeMDI(MR-200), INDEX = (mols of NCO groups/mols of OH groups) × 100, manufactured by Nippon Polyurethane Industry Co., Ltd.

TABLE 4

|  | Examples | | | | | | | | | |
|---|---|---|---|---|---|---|---|---|---|---|
|  | 7 | 8 | 9 | 10 | 11 | 12 | 13 | 14 | 15 | 16 |
| Reactivity (seconds) |  |  |  |  |  |  |  |  |  |  |
| Cream time | 9 | 9 | 8 | 10 | 8 | 7 | 9 | 10 | 10 | 11 |
| Gel time | 60 | 61 | 59 | 60 | 60 | 61 | 60 | 60 | 60 | 60 |
| Tack free time | 84 | 85 | 93 | 99 | 87 | 90 | 85 | 96 | 90 | 94 |
| Rise time | 93 | 94 | 101 | 107 | 98 | 101 | 90 | 117 | 98 | 106 |
| Physical properties of foam |  |  |  |  |  |  |  |  |  |  |
| Flowability (cm) | 80 | 80 | 83 | 82 | 83 | 83 | 81 | 81 | 80 | 81 |
| Core density (kg/m$^3$) | 25.1 | 25.2 | 24.7 | 25.1 | 24.7 | 24.8 | 25.0 | 25.2 | 25.2 | 25.1 |
| Thermal conductivity (mW/mK) | 18.4 | 18.4 | 18.1 | 18.1 | 18.3 | 18.2 | 18.5 | 18.5 | 18.3 | 18.4 |
| Dimensional stability (%) | −0.9 | −1.1 | −1.5 | −1.0 | −1.4 | −1.6 | −0.8 | −1.0 | −1.1 | −1.0 |

|  | Comparative Examples | | | | | | | | | |
|---|---|---|---|---|---|---|---|---|---|---|
|  | 15 | 16 | 17 | 18 | 19 | 20 | 21 | 22 | 23 | 24 |
| Reactivity (seconds) |  |  |  |  |  |  |  |  |  |  |
| Cream time | 12 | 12 | 12 | 14 | 13 | 8 | 12 | 11 | 12 | 13 |
| Gel time | 60 | 60 | 61 | 59 | 60 | 59 | 60 | 61 | 60 | 60 |
| Tack free time | 82 | 83 | 88 | 92 | 81 | 75 | 82 | 73 | 88 | 90 |
| Rise time | 94 | 98 | 95 | 100 | 92 | 88 | 95 | 92 | 96 | 96 |
| Physical properties of foam |  |  |  |  |  |  |  |  |  |  |
| Flowability (cm) | 72 | 70 | 73 | 73 | 76 | 75 | 76 | 74 | 73 | 74 |
| Core density (kg/m$^3$) | 26.5 | 26.6 | 25.9 | 26.4 | 26.0 | 26.0 | 26.3 | 26.4 | 26.5 | 26.4 |
| Thermal conductivity (mW/mK) | 18.3 | 18.4 | 18.1 | 18.2 | 18.4 | 18.1 | 18.4 | 18.8 | 18.1 | 18.2 |
| Dimensional stability (%) | −1.2 | −2.0 | −0.9 | −0.8 | −1.0 | −1.1 | −1.1 | −0.9 | −1.0 | −1.2 |

COMPARATIVE EXAMPLES 15 TO 24

The polyol, the blowing agent and surfactant were mixed in the mixing ratio as shown in Table 3 to prepare premix A. 48.6 g of premix A was taken into a 300 ml polyethylene cup, and the catalyst shown in Table 3, was added in an amount such that the reactivity would be 60 seconds as represented by the following gel time, and the temperature was adjusted to 20° C. A polyisocyanate liquid (MR-200) having the temperature adjusted to 20° C. in a separate container, was put into the cup of premix A in an amount such that the isocyanate index (molar ratio of isocyanate groups/OH groups×100) would be 110, and quickly stirred by a stirrer at 6,500 rpm for 3 seconds. The mixed solution obtained by stirring was transferred to a 2 l polyethylene cup adjusted to a temperature of 40° C., whereupon the reactivity during foaming was measured. Then, the starting material scale was increased, and the mixed solution was put into a mold adjusted to a temperature of 40° C. in the same manner, and foam molding was carried out. Upon expiration of 10 minutes from the time when the mixed solution was introduced, the foam was removed from the mold. From the molded foam, the flowability, the core density, the thermal conductivity and the dimensional stability of the foam, were evaluated. The results are shown in Table 4.

As is evident from Table 4, in the method for producing a rigid polyurethane foam employing 1,1,1,3,3-pentafluoropropane (HFC-245fa) as a blowing agent, a foam excellent in the flowability, thermal conductivity and dimensional stability can be produced by using the amine compound of the present invention as a catalyst.

Namely, Examples 7 to 16 are Examples wherein rigid polyurethane foams were produced by using the catalysts of the present invention, and in each of them, a rigid urethane foam excellent in the flowability, thermal conductivity and dimensional stability, was obtained.

Whereas, Comparative Examples 15 to 24 are Examples wherein 1,1-dichloro-1-fluoroethane (HCFC-141b) was used as a blowing agent, whereby even when the amine compounds of the present invention were used as catalysts, no distinct effects were observed with respect to the flowability, thermal conductivity and dimensional stability of the foams.

EXAMPLES 17 TO 19 AND COMPARATIVE EXAMPLES 25 TO 29

The polyol, the blowing agent and surfactant were mixed in the mixing ratio as shown in Table 5 to prepare premix A. 48.6 g of premix A was taken into a 300 ml polyethylene cup, and the catalyst shown in Table 5, was added in an amount such that the reactivity would be 60 seconds as represented by the following gel time, and the temperature was adjusted to 10° C. A polyisocyanate liquid (MR-200) having the temperature adjusted to 10° C. in a separate container, was put into the cup of premix A in an amount such that the isocyanate index (molar ratio of isocyanate groups/OH groups×100) would be 110, and quickly stirred by a stirrer at 6,500 rpm for 3 seconds. The mixed solution obtained by stirring was transferred to a 2 l polyethylene cup adjusted to a temperature of 40° C., whereupon the reactivity during foaming was measured. Then, the starting material scale was increased, and the mixed solution was put into a mold adjusted to a temperature of 40° C. in the same manner, and foam molding was carried out. Upon expiration of 10 minutes from the time when the mixed solution was introduced, the foam was removed from the mold. From the molded foam, the flowability, the core density, the thermal conductivity and the dimensional stability of the foam, were evaluated. The results are shown in Table 6.

TABLE 5

| | | Examples | | | Comparative Examples | | | | | | | | | | |
|---|---|---|---|---|---|---|---|---|---|---|---|---|---|---|---|
| | | 17 | 18 | 19 | 25 | 26 | 27 | 28 | 29 | 30 | 31 | 32 | 33 | 34 | 35 | 36 |
| Mixing | Premix A | | | | | | | | | | | | | | | |
| ratio (parts by weight) | Polyol[1] | 100 | 100 | 100 | 100 | 100 | 100 | 100 | 100 | 100 | 100 | 100 | 100 | 100 | 100 | 100 |
| | HFC-245fa | 35 | 45 | 25 | 35 | 35 | 35 | 35 | 35 | | | | | | | |
| | HCFC-141b | | | | | | | | | 35 | 45 | 25 | 35 | 35 | 35 | 35 |
| | Water | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
| | Surfactant[2] | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| | Amine catalyst | | | | | | | | | | | | | | | |
| | Catalyst A[3] | 7.0 | 7.5 | 7.2 | | | | | | 5.0 | 5.2 | 5.0 | | | | |
| | Catalyst B[4] | | | | 4.8 | | 3.0 | | | | | | 3.1 | | 1.5 | |
| | Catalyst C[5] | | | | | 6.5 | | 3.2 | | | | | | 4.5 | | |
| | Catalyst D[6] | | | | | | 1.0 | 1.1 | | | | | | | 0.5 | |
| | Catalyst E[7] | | | | | | | | 5.9 | | | | | | | 3.3 |
| | Isocyanate INDEX[8] | 110 | 110 | 110 | 110 | 110 | 110 | 110 | 110 | 110 | 110 | 110 | 110 | 110 | 110 | 110 |

[1] Sucrose/aromatic amine type polyether polyol (OH value = 440 mgKOH/g), manufactured by Asahi Glass Company, Limited
[2] Silicone type surfactant (Tradename: SZ-1627), manufactured by Nippon Unicar Company Limited
[3] N-(2-dimethylaminoethyl)-N'-methylpiperazine (TOYOCAT-NP, manufactured by TOSOH CORPORATION)
[4] N,N,N',N'-tetramethylhexamethylenediamine (TOYOCAT-MR, manufactured by TOSOH CORPORATION)
[5] N,N-dimethylcyclohexylamine (manufactured by Aldrich)
[6] N,N,N',N',N''-pentamethyldiethylenetriamine (TOYOCAT-DT, manufactured by TOSOH CORPORATION)
[7] Triethylenediamine 33 wt % ethylene glycol solution (tradename: TEDA-L33, manufactured by TOSOH CORPORATION)
[8] CrudeMDI(MR-200), INDEX = (mols of NCO groups/mols of OH groups) × 100, manufactured by Nippon Polyurethane Industry Co., Ltd.

TABLE 6

| | Examples | | | Comparative Examples | | | | | | | | | | | |
|---|---|---|---|---|---|---|---|---|---|---|---|---|---|---|---|
| | 17 | 18 | 19 | 25 | 26 | 27 | 28 | 29 | 30 | 31 | 32 | 33 | 34 | 35 | 36 |
| Reactivity (seconds) | | | | | | | | | | | | | | | |
| Cream time | 13 | 11 | 12 | 11 | 11 | 7 | 6 | 15 | 12 | 9 | 10 | 16 | 13 | 11 | 21 |
| Gel time | 61 | 59 | 60 | 59 | 60 | 59 | 58 | 60 | 52 | 60 | 60 | 61 | 61 | 59 | 60 |
| Tack free time | 72 | 65 | 75 | 64 | 72 | 66 | 69 | 65 | 66 | 72 | 77 | 74 | 76 | 79 | 71 |
| Rise time | 84 | 80 | 86 | 73 | 82 | 77 | 79 | 77 | 78 | 89 | 90 | 86 | 92 | 92 | 86 |

TABLE 6-continued

|  | Examples ||| Comparative Examples |||||||||||||
|---|---|---|---|---|---|---|---|---|---|---|---|---|---|---|---|
|  | 17 | 18 | 19 | 25 | 26 | 27 | 28 | 29 | 30 | 31 | 32 | 33 | 34 | 35 | 36 |
| Physical properties of foam |
| Flowability (cm) | 80 | 82 | 80 | 74 | 75 | 76 | 76 | 72 | 81 | 82 | 80 | 78 | 80 | 81 | 73 |
| Core density (kg/m$^3$) | 26.3 | 24.0 | 28.5 | 26.3 | 26.1 | 25.6 | 25.8 | 26.8 | 26.6 | 24.3 | 28.6 | 26.8 | 26.5 | 29.7 | 26.0 |
| Thermal conductivity (mW/mK) | 18.1 | 18.2 | 18.3 | 19.2 | 19.2 | 19.4 | 19.4 | 19.8 | 18.3 | 18.2 | 18.1 | 18.1 | 18.3 | 18.4 | 17.6 |
| Dimensional stability (%) | −0.9 | −0.7 | −0.7 | −4.8 | −2.8 | −6.9 | −0.8 | −5.8 | −4.0 | −1.0 | −0.8 | −1.0 | −0.7 | −0.9 | −0.3 |

COMPARATIVE EXAMPLES 30 TO 36

The polyol, the blowing agent and surfactant were mixed in the mixing ratio as shown in Table 5 to prepare premix A. 48.6 g of premix A was taken into a 300 ml polyethylene cup, and the catalyst shown in Table 5, was added in an amount such that the reactivity would be 60 seconds as represented by the following gel time, and the temperature was adjusted to 20° C. A polyisocyanate liquid (MR-200) having the temperature adjusted to 20° C. in a separate container, was put into the cup of premix A in an amount such that the isocyanate index (molar ratio of isocyanate groups/OH groups×100) would be 110, and quickly stirred by a stirrer at 6,500 rpm for 3 seconds. The mixed solution obtained by stirring was transferred to a 2 l polyethylene cup adjusted to a temperature of 40° C., whereupon the reactivity during foaming was measured. Then, the starting material scale was increased, and the mixed solution was put into a mold adjusted to a temperature of 40° C. in the same manner, and foam molding was carried out. Upon expiration of 10 minutes from the time when the mixed solution was introduced, the foam was removed from the mold. From the molded foam, the flowability, the core density, the thermal conductivity and the dimensional stability of the foam, were evaluated. The results are shown in Table 6.

As is evident from Table 5, in the method for producing a rigid polyurethane foam employing 1,1,1,3,3-pentafluoropropane (HFC-245fa) as a blowing agent, a foam excellent in the flowability, thermal conductivity and dimensional stability can be produced by using the amine compound of the present invention as a catalyst.

Namely, Examples 17 to 19 are Examples wherein rigid polyurethane foams were produced by using the catalysts of the present invention, and in each of them, a rigid urethane foam excellent in the flowability, thermal conductivity and dimensional stability, was obtained.

Whereas, Comparative Examples 25 to 29 are Examples wherein common tertiary amine catalysts were used, whereby the foams were inferior in the flowability and thermal conductivity. Further, Comparative Examples 30 to 36 are Examples wherein 1,1-dichloro-1-fluoroethane (HCFC-141b) was used as a blowing agent, whereby even when the amine compounds of the present invention were used as catalysts, no distinct effects were observed with respect to the flowability, thermal conductivity and dimensional stability of the foams.

EXAMPLES 20 TO 24 AND COMPARATIVE EXAMPLES 37 TO 48

The polyol, the blowing agent and surfactant were mixed in the mixing ratio as shown in Table 7 to prepare premix A. 48.6 g of premix A was taken into a 300 ml polyethylene cup, and the catalyst shown in Table 7, was added in an amount such that the reactivity would be 45 seconds as represented by the following gel time, and the temperature was adjusted to 20° C. A polyisocyanate liquid (MR-200) having the temperature adjusted to 20° C. in a separate container, was put into the cup of premix A in an amount such that the isocyanate index (molar ratio of isocyanate groups/OH groups×100) would be 110, and quickly stirred by a stirrer at 6,500 rpm for 3 seconds. The mixed solution obtained by stirring was transferred to a 2 l polyethylene cup adjusted to a temperature of 40° C., whereupon the reactivity during foaming was measured. Then, the starting material scale was increased, and the mixed solution was put into a mold adjusted to a temperature of 40° C. in the same manner, and foam molding was carried out. Upon expiration of 10 minutes from the time when the mixed solution was introduced, the foam was removed from the mold. From the molded foam, the flowability, the core density, the thermal conductivity and the dimensional stability of the foam, were evaluated. The results are shown in Table 8.

TABLE 7

|  |  | Examples ||||| Comparative Examples ||||||||||||
|---|---|---|---|---|---|---|---|---|---|---|---|---|---|---|---|---|---|
|  |  | 20 | 21 | 22 | 23 | 24 | 37 | 38 | 39 | 40 | 41 | 42 | 43 | 44 | 45 | 46 | 47 | 48 |
| Mixing | Premix A |
| ratio | Polyol[1] | 100 | 100 | 100 | 100 | 100 | 100 | 100 | 100 | 100 | 100 | 100 | 100 | 100 | 100 | 100 | 100 | 100 |
| (parts | HFC-365mfc | 45 | 45 | 45 | 45 | 45 | 45 | 45 | 45 | 45 |  |  |  |  |  |  |  |  |
| by | HCFC-141b |  |  |  |  |  |  |  |  |  | 35 | 35 | 35 | 35 | 35 | 35 | 35 | 35 |
| weight) | Water | 2.2 | 2.2 | 2.2 | 2.2 | 2.2 | 2.2 | 2.2 | 2.2 | 2.2 | 2.0 | 2.0 | 2.0 | 2.0 | 2.0 | 2.0 | 2.0 | 2.0 |
|  | Surfactant[2] | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |

TABLE 7-continued

|  | Examples | | | | | Comparative Examples | | | | | | | | | | |
| --- | --- | --- | --- | --- | --- | --- | --- | --- | --- | --- | --- | --- | --- | --- | --- | --- |
|  | 20 | 21 | 22 | 23 | 24 | 37 | 38 | 39 | 40 | 41 | 42 | 43 | 44 | 45 | 46 | 47 | 48 |
| Amine catalyst | | | | | | | | | | | | | | | | | |
| Catalyst A[3] | 5.4 | | | | | | | | 4.3 | | | | | | | | |
| Catalyst B[4] | | 5.3 | | | | | | | | | 4.3 | | | | | | |
| Catalyst C[5] | | | 4.6 | | | | | | | | | | 3.4 | | | | |
| Catalyst D[6] | | | | 5.3 | | | | | | | | | | | 5.1 | | |
| Catalyst E[7] | | | | | 6.8 | | | | | | | | | | | | |
| Catalyst F[8] | | | | | | 3.5 | | 1.8 | | | | | | 2.8 | | 1.5 | |
| Catalyst G[9] | | | | | | | 4.5 | | | | | | | | 4.1 | | |
| Catalyst H[10] | | | | | | | | 0.9 | | | | | | | | 0.5 | |
| Catalyst I[11] | | | | | | | | | | 4.6 | | | | | | | 3.1 |
| Isocyanate INDEX[12] | 110 | 110 | 110 | 110 | 110 | 110 | 110 | 110 | 110 | 110 | 110 | 110 | 110 | 110 | 110 | 110 | 110 |

[1] Sucrose/aromatic amine type polyether polyol (OH value = 440 mgKOH/g), manufactured by Asahi Glass Company, Limited
[2] Silicone type surfactant (Tradename: SZ-1627), manufactured by Nippon Unicar Company Limited
[3] N,N-dimethylaminoethoxyethanol (manufactured by TOSOH CORPORATION)
[4] N,N,N'-trimethylaminoethylethanolamine (manufactured by TOSOH CORPORATION)
[5] N,N-dimethylpropylenediamine (manufactured by TOSOH CORPORATION)
[6] N,N-dimethylaminoethyl-N'-methylaminoethyl-N''-methylaminoisopropanol (product obtained by adding propylene oxide to diethylene triamine, followed by reduction methylation)
[7] Bis(N,N-dimethylaminopropyl)amine (manufactured by Aldrich)
[8] N,N,N',N'-tetramethylhexamethylenediamine (TOYOCAT-MR, manufactured by TOSOH CORPORATION)
[9] N,N-dimethylcyclohexylamine (manufactured by Aldrich)
[10] N,N,N',N',N''-pentamethyldiethylenetriamine (TOYOCAT-DT, manufactured by TOSOH CORPORATION)
[11] Triethylenediamine 33 wt % ethylene glycol solution (tradename: TEDA-L33, manufactured by TOSOH CORPORATION)
[12] CrudeMDI(MR-200), INDEX = (mols of NCO groups/mols of OH groups) × 100, manufactured by Nippon Polyurethane Industry Co., Ltd.

TABLE 8

|  | Examples | | | | | Comparative Examples | | | | | | | | | | |
| --- | --- | --- | --- | --- | --- | --- | --- | --- | --- | --- | --- | --- | --- | --- | --- | --- |
|  | 20 | 21 | 22 | 23 | 24 | 37 | 38 | 39 | 40 | 41 | 42 | 43 | 44 | 45 | 46 | 47 | 48 |
| Reactivity (seconds) | | | | | | | | | | | | | | | | | |
| Cream time | 7 | 6 | 8 | 6 | 6 | 13 | 12 | 8 | 15 | 7 | 7 | 10 | 8 | 12 | 10 | 8 | 16 |
| Gel time | 45 | 45 | 44 | 45 | 45 | 46 | 45 | 45 | 45 | 45 | 46 | 45 | 45 | 45 | 45 | 45 | 45 |
| Tack free time | 70 | 67 | 69 | 64 | 68 | 61 | 77 | 85 | 72 | 72 | 70 | 64 | 63 | 65 | 62 | 66 | 57 |
| Rise time | 75 | 79 | 72 | 78 | 73 | 78 | 81 | 78 | 82 | 83 | 79 | 80 | 82 | 74 | 75 | 77 | 69 |
| Physical properties of foam | | | | | | | | | | | | | | | | | |
| Flowability (cm) | 81 | 82 | 80 | 79 | 81 | 73 | 74 | 76 | 70 | 78 | 78 | 79 | 77 | 79 | 77 | 78 | 80 |
| Core density (kg/m$^3$) | 24.0 | 24.5 | 23.8 | 24.1 | 24.3 | 24.5 | 23.6 | 24.6 | 24.8 | 24.8 | 23.1 | 24.8 | 24.5 | 25.2 | 24.6 | 26.0 | 26.0 |
| Thermal conductivity (mW/mK) | 18.1 | 17.8 | 18.2 | 18.3 | 18.0 | 19.0 | 19.7 | 19.2 | 19.6 | 18.8 | 18.3 | 18.6 | 18.5 | 18.1 | 18.4 | 18.5 | 17.8 |
| Dimensional stability (%) | −0.8 | −1.0 | −0.7 | −1.1 | −1.0 | −0.9 | −1.1 | −0.7 | −0.8 | −1.1 | −1.3 | −0.9 | −0.8 | −0.9 | −1.0 | 1.0 | −0.7 |

As is evident from Table 8, in the method for producing a rigid polyurethane foam employing 1,1,1,3,3-pentafluorobutane (HFC-365mfc) as a blowing agent, a foam excellent in the flowability, thermal conductivity and dimensional stability can be produced by using the amine compound of the present invention as a catalyst.

Namely, Examples 20 to 24 are Examples wherein rigid polyurethane foams were produced by using the catalysts of to present invention, and in each of them, a rigid urethane foam excellent in the flowability, thermal conductivity and dimensional stability, was obtained.

Whereas, Comparative Examples 37 to 40 are Examples employing tertiary amine catalysts having no hydroxyl group, or primary or secondary amino group in their molecules, whereby the foams were inferior in the flowability and thermal conductivity. Further, Comparative Examples 41 to 48 are Examples in which 1,1-dichloro-1-fluoroethane (HCFC-141b) was used as a blowing agent, whereby even when the amine compounds of the present invention were used as catalysts, no distinct effects were observed with respect to the flowability, thermal conductivity and dimensional stability of the foams.

EXAMPLES 25 TO 34

The polyol, the blowing agent and surfactant were mixed in the mixing ratio as shown in Table 9 to prepare premix A. 48.6 g of premix A was taken into a 300 ml polyethylene cup, and the catalyst shown in Table 9, was added in an amount such that the reactivity would be 45 seconds as represented by the following gel time, and the temperature was adjusted to 20° C. A polyisocyanate liquid (MR-200) having the temperature adjusted to 20° C. in a separate container, was put into the cup of premix A in an amount such that the isocyanate index (molar ratio of isocyanate groups/OH groups×100) would be 110, and quickly stirred by a stirrer at 6,500 rpm for 3 seconds. The mixed solution obtained by stirring was transferred to a 2 l polyethylene cup adjusted to a temperature of 40° C., whereupon the reactivity during foaming was measured. Then, the starting material scale was increased, and the mixed solution was put into a mold adjusted to a temperature of 40° C. in the same manner, and foam molding was carried out. Upon expiration of 10 minutes from the time when the mixed solution was introduced, the foam was removed from the mold. From the molded foam, the flowability, the core density, the thermal conductivity and the dimensional stability of the foam, were evaluated. The results are shown in Table 10.

TABLE 9

|  |  | Examples | | | | | | | | | |
|---|---|---|---|---|---|---|---|---|---|---|---|
|  |  | 25 | 26 | 27 | 28 | 29 | 30 | 31 | 32 | 33 | 34 |
| Mixing ratio | Premix A | | | | | | | | | | |
| (parts by weight) | Polyol[1] | 100 | 100 | 100 | 100 | 100 | 100 | 100 | 100 | 100 | 100 |
|  | HFC-365mfc | 45 | 45 | 45 | 45 | 45 | 45 | 45 | 45 | 45 | 45 |
|  | HCFC-141b | | | | | | | | | | |
|  | Water | 2.2 | 2.2 | 2.2 | 2.2 | 2.2 | 2.2 | 2.2 | 2.2 | 2.2 | 2.2 |
|  | Surfactant[2] | 2.0 | 2.0 | 2.0 | 2.0 | 2.0 | 2.0 | 2.0 | 2.0 | 2.0 | 2.0 |
|  | Amine catalyst | | | | | | | | | | |
|  | Catalyst A[3] | 6.8 | | | | | | | | | |
|  | Catalyst B[4] | | 8.1 | | | | | | | | |
|  | Catalyst C[5] | | | 0.9 | | | | | | | |
|  | Catalyst D[6] | | | | 3.0 | | | | | | |
|  | Catalyst E[7] | | | | | 5.5 | | | | | |
|  | Catalyst F[8] | | | | | | 4.6 | | | | |
|  | Catalyst G[9] | | | | | | | 5.3 | | | |
|  | Catalyst H[10] | | | | | | | | 7.5 | | |
|  | Catalyst I[11] | | | | | | | | | 10.8 | |
|  | Catalyst J[12] | | | | | | | | | | 6.0 |
|  | Catalyst K[13] | | | 3.6 | 3.0 | | | | | | |
|  | Isocyanate INDEX[14] | 110 | 110 | 110 | 110 | 110 | 110 | 110 | 110 | 110 | 110 |

|  |  | Comparative Examples | | | | | | | | | |
|---|---|---|---|---|---|---|---|---|---|---|---|
|  |  | 49 | 50 | 51 | 52 | 53 | 54 | 55 | 56 | 57 | 58 |
| Mixing ratio | Premix A | | | | | | | | | | |
| (parts by weight) | Polyol[1] | 100 | 100 | 100 | 100 | 100 | 100 | 100 | 100 | 100 | 100 |
|  | HFC-365mfc | | | | | | | | | | |
|  | HCFC-141b | 35 | 35 | 35 | 35 | 35 | 35 | 35 | 35 | 35 | 35 |
|  | Water | 1.8 | 1.8 | 1.8 | 1.8 | 1.8 | 1.8 | 1.8 | 1.8 | 1.8 | 1.8 |
|  | Surfactant[2] | 2.0 | 2.0 | 2.0 | 2.0 | 2.0 | 2.0 | 2.0 | 2.0 | 2.0 | 2.0 |
|  | Amine catalyst | | | | | | | | | | |
|  | Catalyst A[3] | 5.2 | | | | | | | | | |
|  | Catalyst B[4] | | 6.2 | | | | | | | | |
|  | Catalyst C[5] | | | 0.7 | | | | | | | |
|  | Catalyst D[6] | | | | 2.3 | | | | | | |
|  | Catalyst E[7] | | | | | 4.0 | | | | | |
|  | Catalyst F[8] | | | | | | 3.5 | | | | |
|  | Catalyst G[9] | | | | | | | 3.9 | | | |
|  | Catalyst H[10] | | | | | | | | 5.6 | | |
|  | Catalyst I[11] | | | | | | | | | 8.0 | |
|  | Catalyst J[12] | | | | | | | | | | 4.5 |
|  | Catalyst K[13] | | | 2.8 | 2.3 | | | | | | |
|  | Isocyanate INDEX[14] | 110 | 110 | 110 | 110 | 110 | 110 | 110 | 110 | 110 | 110 |

[1] Sucrose/aromatic amine type polyether polyol (OH value = 440 mgKOH/g), manufactured by Asahi Glass Company, Limited
[2] Silicone type surfactant (Tradename: SZ-1627), manufactured by Nippon Unicar Company Limited
[3] N,N-dimethylaminoethanol (manufactured by Aldrich)
[4] N,N-dimethylaminoisopropanol (manufactured by Aldrich)
[5] N-acetylethylenediamine (manufactured by TOKYO KASEI KOGYO Co., Ltd.)
[6] Polyoxypropylenediamine (product prepared by amination of polyethylene glycol, n = 2.6)
[7] N,N-dimethylaminopropyl-N'-methylaminoethanol (product obtained by adding ethylene oxide to diaminoethylether, followed by reduction methylation)
[8] N,N,N'-trimethyl-N'-hydroxyethylbisaminoethylether (manufactured by Aldrich)
[9] N,N-bis(3-dimethylaminopropyl)-N-isopropanolamine (product prepared by adding polypropylene oxide to bis(3-methylaminopropyl)amine)
[10] N-(3-dimethylaminopropyl)-N,N-diisopropanolamine (manufactured by Aldrich)
[11] N-(2-hydroxyethyl)-N'-methylpiperazine (tradename: TOYOCAT-HP, manufactured by TOSOH CORPORATION)
[12] N,N-dimethylaminohexanol (manufactured by TOKYO KASEI KOGYO Co., Ltd.)
[13] N,N,N',N'-tetramethylhexamethylenediamine (tradename: TOYOCAT-MR, manufactured by TOSOH CORPORATION)
[14] CrudeMDI(MR-200), INDEX = (mols of NCO groups/mols of OH groups) × 100, manufactured by Nippon Polyurethane Industry Co., Ltd.

TABLE 10

|  | Examples | | | | | | | | | |
| --- | --- | --- | --- | --- | --- | --- | --- | --- | --- | --- |
|  | 25 | 26 | 27 | 28 | 29 | 30 | 31 | 32 | 33 | 34 |
| Reactivity (seconds) | | | | | | | | | | |
| Cream time | 8 | 8 | 7 | 9 | 8 | 7 | 8 | 9 | 9 | 9 |
| Gel time | 45 | 46 | 44 | 45 | 45 | 45 | 44 | 46 | 45 | 45 |
| Tack free time | 74 | 75 | 82 | 88 | 77 | 80 | 76 | 85 | 80 | 83 |
| Rise time | 83 | 85 | 90 | 96 | 98 | 90 | 80 | 105 | 88 | 95 |
| Physical properties of foam | | | | | | | | | | |
| Flowability (cm) | 79 | 80 | 81 | 82 | 82 | 83 | 80 | 82 | 82 | 81 |
| Core density (kg/m$^3$) | 24.0 | 24.1 | 23.8 | 24.0 | 23.7 | 23.8 | 24.0 | 24.1 | 24.3 | 24.0 |
| Thermal conductivity (mW/mK) | 18.3 | 18.4 | 18.2 | 18.1 | 18.2 | 18.3 | 18.4 | 18.3 | 18.2 | 18.3 |
| Dimensional stability (%) | −0.8 | −0.8 | −1.0 | −0.6 | −0.9 | −0.8 | −0.9 | −0.6 | −0.8 | −0.6 |

|  | Comparative Examples | | | | | | | | | |
| --- | --- | --- | --- | --- | --- | --- | --- | --- | --- | --- |
|  | 49 | 50 | 51 | 52 | 53 | 54 | 55 | 56 | 57 | 58 |
| Reactivity (seconds) | | | | | | | | | | |
| Cream time | 8 | 8 | 8 | 10 | 9 | 6 | 8 | 7 | 8 | 9 |
| Gel time | 45 | 45 | 46 | 44 | 45 | 44 | 45 | 46 | 45 | 45 |
| Tack free time | 72 | 73 | 78 | 81 | 71 | 65 | 70 | 65 | 78 | 80 |
| Rise time | 84 | 88 | 85 | 90 | 82 | 78 | 85 | 82 | 86 | 86 |
| Physical properties of foam | | | | | | | | | | |
| Flowability (cm) | 73 | 71 | 72 | 73 | 75 | 75 | 74 | 75 | 72 | 73 |
| Core density (kg/m$^3$) | 26.4 | 26.5 | 26.0 | 26.3 | 26.1 | 26.2 | 26.1 | 26.2 | 26.4 | 26.3 |
| Thermal conductivity (mW/mK) | 18.5 | 18.6 | 18.5 | 18.4 | 18.6 | 18.3 | 18.6 | 18.9 | 18.5 | 18.4 |
| Dimensional stability (%) | −1.4 | −2.2 | −1.1 | −1 | −1.2 | −0.1 | −1.2 | −1.1 | −1.2 | −1.3 |

COMPARATIVE EXAMPLES 49 TO 58

The polyol, the blowing agent and surfactant were mixed in the mixing ratio as shown in Table 9 to prepare premix A. 48.6 g of premix A was taken into a 300 ml polyethylene cup, and the catalyst shown in Table 9, was added in an amount such that the reactivity would be 45 seconds as represented by the following gel time, and the temperature was adjusted to 20° C. A polyisocyanate liquid (MR-200) having the temperature adjusted to 20° C. in a separate container, was put into the cup of premix A in an amount such that the isocyanate index (molar ratio of isocyanate groups/OH groups×100) would be 110, and quickly stirred by a stirrer at 6,500 rpm for 3 seconds. The mixed solution obtained by stirring was transferred to a 2 l polyethylene cup adjusted to a temperature of 40° C., whereupon the reactivity during foaming was measured. Then, the starting material scale was increased, and the mixed solution was put into a mold adjusted to a temperature of 40° C. in the same manner, and foam molding was carried out. Upon expiration of 10 minutes from the time when the mixed solution was introduced, the foam was removed from the mold. From the molded foam, the flowability, the core density, the thermal conductivity and the dimensional stability of the foam, were evaluated. The results are shown in Table 10.

As is evident from Table 10, in the method for producing a rigid polyurethane foam employing 1,1,1,3,3-pentaflourobutane (HFC-365fa) as a blowing agent, a foam excellent in the flowability, thermal conductivity and dimensional stability can be produced by using the amine compound of the present invention as a catalyst.

Namely, Examples 25 to 34 are Examples wherein rigid polyurethane foams were produced by using the catalysts of the present invention, and in each of them, a rigid urethane foam excellent in the flowability, thermal conductivity and dimensional stability, was obtained.

Whereas, Comparative Examples 49 to 58 are Examples wherein 1,1-dichloro-1-fluoroethane (HCFC-141b) was used as a blowing agent, whereby even when the amine compounds of the present invention were used as catalysts, no distinct effects were observed with respect to the flowability, thermal conductivity and dimensional stability of the foams.

According to the method of the present invention, a rigid polyurethane foam excellent in the flowability, thermal conductivity and dimensional stability of the foam, can be produced without impairing the physical properties of the foam, even if 1,1,1,3,3-pentafluoropropane (HFC-245fa) and/or 1,1,1,3,3-pentafluorobutane (HFC-365mfc) is used as a blowing agent.

Further, according to the method of the present invention, it is possible to obtain a foam physically comparable or superior to the foam produced by using a conventional blowing agent (HCFC-141b).

The entire disclosures of Japanese Patent Application No. 2001-200960 filed on Jul. 2, 2001, Japanese Patent Application No. 2001-221551 filed on Jul. 23, 2001 and Japanese Patent Application No. 2001-221552 filed on Jul. 23, 2001 including specifications, claims and summaries are incorporated herein by reference in their entireties.

What is claimed is:

1. A method for producing a rigid polyurethane foam which comprises reacting a polyol with a polyisocyanate in the presence of an amine catalyst and blowing agent, wherein as the amine catalyst, at least one amine compound is selected from the group consisting of N-acetylethylenediamine, N,N,N'-trimethyldiethylenetriamine, N,N,N',N"-tetramethyltriethylenetetramine, N,N,N',N",N"'-pentamethyltetraethylenepentamine, N,N,N',N",N"',N""-hexamethylpentaethylenehexamine, and N,N-dimethylaminoethyl-N'-methylaminoethanol and the blowing agent is 1,1,1,3,3-pentafluoropropane (HFC-245fa).

* * * * *